United States Patent
Wenzel

[19]

[11] Patent Number: 5,878,523
[45] Date of Patent: Mar. 9, 1999

[54] MOTORIZED REELING ASSEMBLY WITH AUTOMATIC CUT-OFF

[76] Inventor: Stephen R. Wenzel, 985 Rte. 9W, Marlboro, N.Y. 12542

[21] Appl. No.: 959,480

[22] Filed: Oct. 30, 1997

[51] Int. Cl.⁶ ............... A01K 87/06; A01K 89/012; A01K 89/01; A01K 89/00
[52] U.S. Cl. ............... 43/21; 242/225; 242/227; 242/263
[58] Field of Search .......... 43/21, 20; 242/225, 242/250, 255, 227, 228, 263; 364/525.28; 318/445, 543, 8; 200/80, 61.51; 315/93, 313, 312, 362

[56] References Cited

U.S. PATENT DOCUMENTS

| | | | |
|---|---|---|---|
| 3,348,788 | 10/1967 | Vinokur | 43/21 |
| 3,438,594 | 4/1969 | Bellefeuille | 43/21 |
| 4,075,629 | 2/1978 | Miyamae | 340/421 |
| 4,262,238 | 4/1981 | Schwarz et al. | 318/341 |
| 4,349,977 | 9/1982 | Brodribb et al. | 43/15 |
| 4,366,425 | 12/1982 | Shen | 318/779 |
| 4,378,652 | 4/1983 | Lindgren | 43/26.1 |
| 4,517,502 | 5/1985 | Aschoff et al. | 318/474 |
| 4,634,072 | 1/1987 | Stealy | 242/84.1 |
| 4,829,457 | 5/1989 | Russo et al. | 364/550 |
| 5,088,657 | 2/1992 | Chen | 242/225 |
| 5,397,071 | 3/1995 | Nanbu | 242/250 |

*Primary Examiner*—Michael J. Carone
*Assistant Examiner*—Fredrick T. French, III

[57] ABSTRACT

An automatic cut-off motorized reeling assembly is provided including a fishing pole with a reel attached thereto at an inboard end thereof. The reel has a handle rotatably coupled thereto and a spool rotatably coupled thereto about an axis perpendicular to an axis about which the handle rotates. A gear assembly is connected between the spool and the handle for automatically reeling the reel only upon the receipt of voltage thus requiring the manual reeling of the reel upon the lack of receipt of voltage. A switch is connected between a power source and the gear means with a deactuated orientation for precluding the supply of voltage to the motor and an actuated orientation adapted to supply voltage to the motor. A cut off mechanism is provided for unconditionally precluding the supply of voltage to the gear assembly upon a load being detected on a line of the pole, as when a fish is caught, thereby requiring the user to manually reel the line.

5 Claims, 3 Drawing Sheets

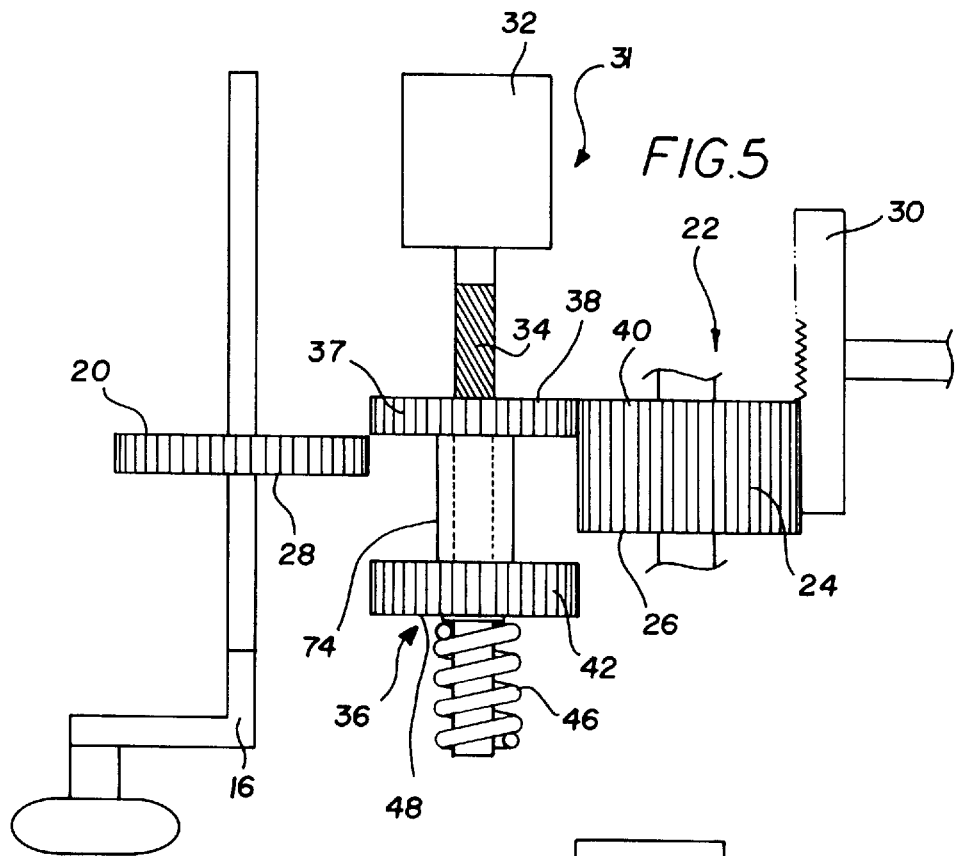
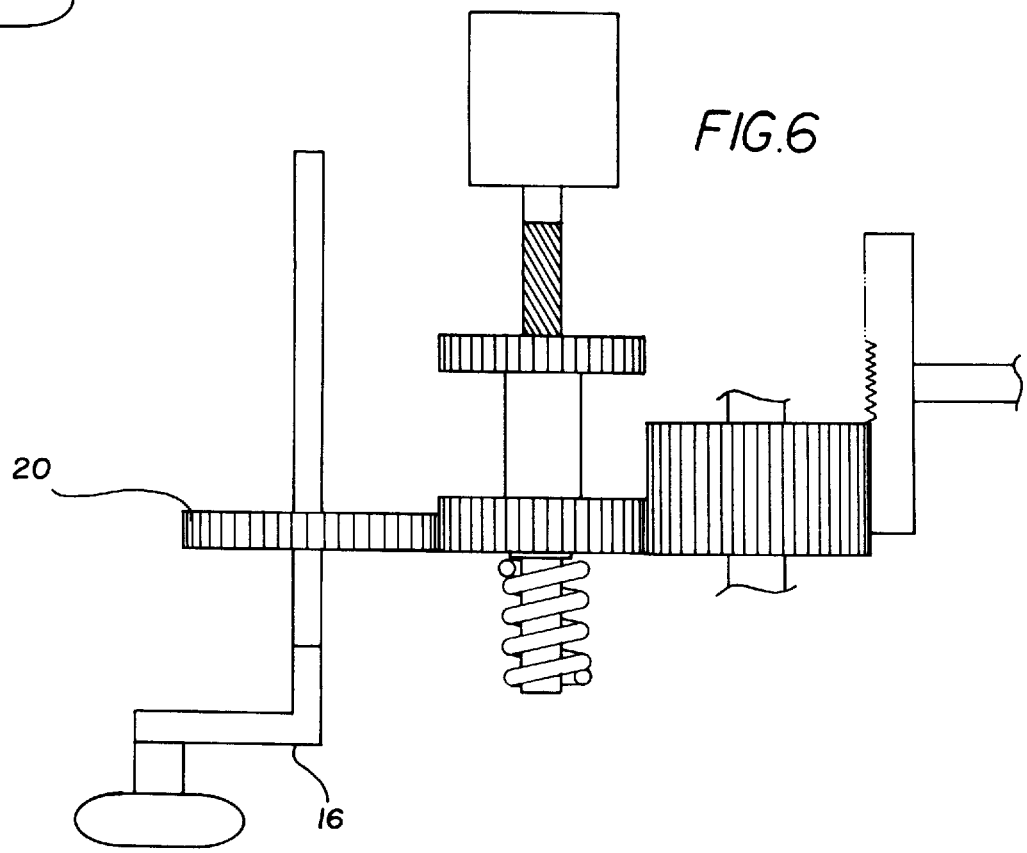

MOTORIZED REELING ASSEMBLY WITH AUTOMATIC CUT-OFF

BACKGROUND OF THE INVENTION

1. Field of the Invention

The present invention relates to automatic reeling assemblies and more particularly pertains to a new motorized reeling assembly with automatic cut-off for requiring the manual reeling of a fish when caught.

2. Description of the Prior Art

The use of automatic reeling assemblies is known in the prior art. More specifically, automatic reeling assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art automatic reeling assemblies include U.S. Pat. No. 5,088,657; U.S. Pat. No. 5,297,071; U.S. Pat. No. 5,156,351; U.S. Pat. No. 5,400,979; U.S. Pat. No. 4,832,277; and U.S. Pat. No. Des. 343,672.

In these respects, the motorized reeling assembly with automatic cut-off according to the present invention substantially departs from the conventional concepts and designs of the prior art, and in so doing provides an apparatus primarily developed for the purpose of requiring the manual reeling of a fish when caught.

SUMMARY OF THE INVENTION

In view of the foregoing disadvantages inherent in the known types of automatic reeling assemblies now present in the prior art, the present invention provides a new motorized reeling assembly with automatic cut-off construction wherein the same can be utilized for requiring the manual reeling of a fish when caught.

The general purpose of the present invention, which will be described subsequently in greater detail, is to provide a new motorized reeling assembly with automatic cut-off apparatus and method which has many of the advantages of the automatic reeling assemblies mentioned heretofore and many novel features that result in a new motorized reeling assembly with automatic cut-off which is not anticipated, rendered obvious, suggested, or even implied by any of the prior art automatic reeling assemblies, either alone or in any combination thereof.

To attain this, the present invention generally comprises a fishing pole with a reel attached thereto at an inboard end thereof. The reel has a handle rotatably coupled thereto. Associated therewith is a spool rotatably coupled to the reel about an axis perpendicular to an axis about which the handle rotates. FIGS. 5 & 6 show a handle gear having a predetermined width fixedly coupled with respect to the handle. Next provided is a spool gear assembly including a first gear with a width twice that of the handle gear. During use, the first gear has a first side face being in coplanar relationship with a first side face of the handle gear. The spool gear assembly further includes a second gear rotatably coupled about an axis perpendicular with respect to the first gear and further in engagement therewith. It should be noted that the second gear is fixed with respect to the spool for rotating coincident with the first gear. Also included is a motor assembly with a motor having a rotor extending between the handle gear and first gear of the spool gear assembly in parallel relationship with the handle. For reasons that will become apparent hereinafter, the rotor has a threaded portion extending between a midpoint of the first gear of the spool gear assembly and a point adjacent the motor. During operation, the rotor of the motor is adapted to rotate at a speed dependent on an amount of voltage supplied thereto. A drive assembly is provided including a motor gear having a bore formed therein to define an inner periphery which has a plurality of threads formed therein. As shown in FIGS. 5 & 6, the motor gear has a width equal to that of the handle gear. The motor gear is threadedly engaged with the threaded portion of the rotor of the motor assembly during use. As such, upon the supply of voltage to the motor, the motor is urged to the end of the threaded portion of the rotor such that a first side face of the motor gear is coplanar relationship with a second side face of the first gear of the spool gear assembly and in engagement therewith for allowing the automatic reeling of the reel. The drive assembly further includes a manual gear having a width equal to that of the handle gear. The manual gear is slidably situated on the rotor with a spacer rotatably mounted on the rotor between the motor gear and the manual gear. To ensure that the motor and manual gears never both engage the first gear of the spool gear assembly at the same time, such spacer is equipped with a width equal to that of the first gear of the spool gear assembly. A spring is coupled between an end of the rotor of the motor assembly and a first side face of the manual gear for urging the manual gear to an orientation in which the first side face thereof is in coplanar relationship with that of the first gear of the spool gear assembly. It should be noted that the spring only urges the manual gear to such orientation upon the lack of receipt of voltage by the motor thereby allowing the manual reeling of the reel. FIGS. 1 & 4 show a speed switch mounted on the pole and connected between a power source and the motor. The speed switch is equipped with a deactuated orientation for precluding the supply of voltage to the motor and a plurality of actuated orientations each adapted to supply a unique voltage to the motor. Finally, a load cut off switch is coupled between the speed switch and the motor for precluding the supply of voltage to the motor upon a load being detected on a line of the pole. Such load is indicative of a fish being on the line. The load cut off switch thus functions to require the user to manually reel the line when a fish is caught.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorized reeling assembly with automatic cut-off apparatus and method which has many of the advantages of the automatic reeling assemblies mentioned heretofore and many novel features that result in a new motorized reeling assembly with automatic cut-off which is not anticipated, rendered obvious, suggested, or even implied by any of the prior art automatic reeling assemblies, either alone or in any combination thereof.

It is another object of the present invention to provide a new motorized reeling assembly with automatic cut-off which may be easily and efficiently manufactured and marketed.

It is a further object of the present invention to provide a new motorized reeling assembly with automatic cut-off which is of a durable and reliable construction.

An even further object of the present invention is to provide a new motorized reeling assembly with automatic cut-off which is susceptible of a low cost of manufacture with regard to both materials and labor, and which accordingly is then susceptible of low prices of sale to the consuming public, thereby making such motorized reeling assembly with automatic cut-off economically available to the buying public.

Still yet another object of the present invention is to provide a new motorized reeling assembly with automatic cut-off which provides in the apparatuses and methods of the prior art some of the advantages thereof, while simultaneously overcoming some of the disadvantages normally associated therewith.

Still another object of the present invention is to provide a new motorized reeling assembly with automatic cut-off for requiring the manual reeling of a fish when caught.

Even still another object of the present invention is to provide a new motorized reeling assembly with automatic cut-off that includes a fishing pole with a reel attached thereto at an inboard end thereof. The reel has a handle rotatably coupled thereto and a spool rotatably coupled thereto about an axis perpendicular to an axis about which the handle rotates. A gear assembly is connected between the spool and the handle for automatically reeling the reel only upon the receipt of voltage thus requiring the manual reeling of the reel upon the lack of receipt of voltage. A switch is connected between a power source and the gear means with a deactuated orientation for precluding the supply of voltage to the motor and an actuated orientation adapted to supply voltage to the motor. A cut off mechanism is provided for unconditionally precluding the supply of voltage to the gear assembly upon a load being detected on a line of the pole, as when a fish is caught, thereby requiring the user to manually reel the line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view of the gears of the present invention when the motor is actuated.

FIG. 6 is a top view of the gears of the present invention when the motor is deactuated.

DESCRIPTION OF THE PREFERRED EMBODIMENT

Figure 1:
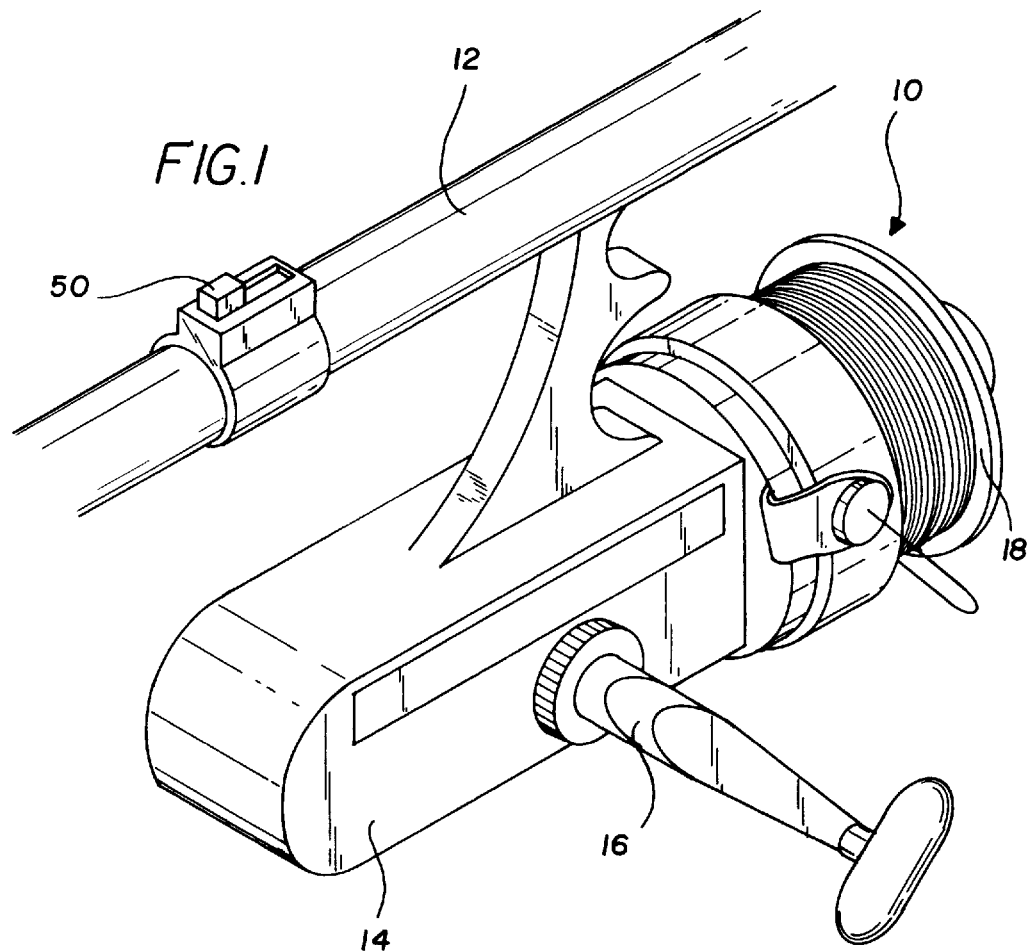
FIG. 1 is a perspective view of a new motorized reeling assembly with automatic cut-off according to the present invention.
Figure 2:
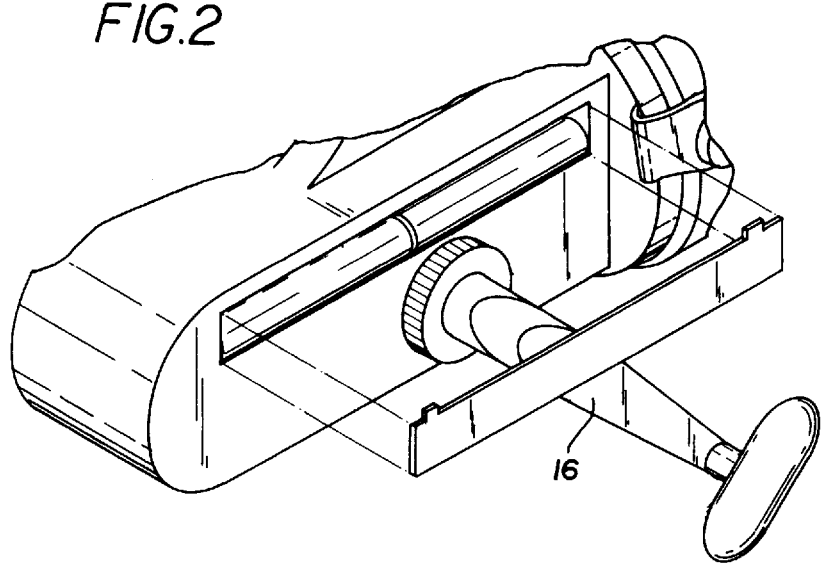
FIG. 2 is a close-up view of the handle and battery compartment of the present invention.
Figure 3:
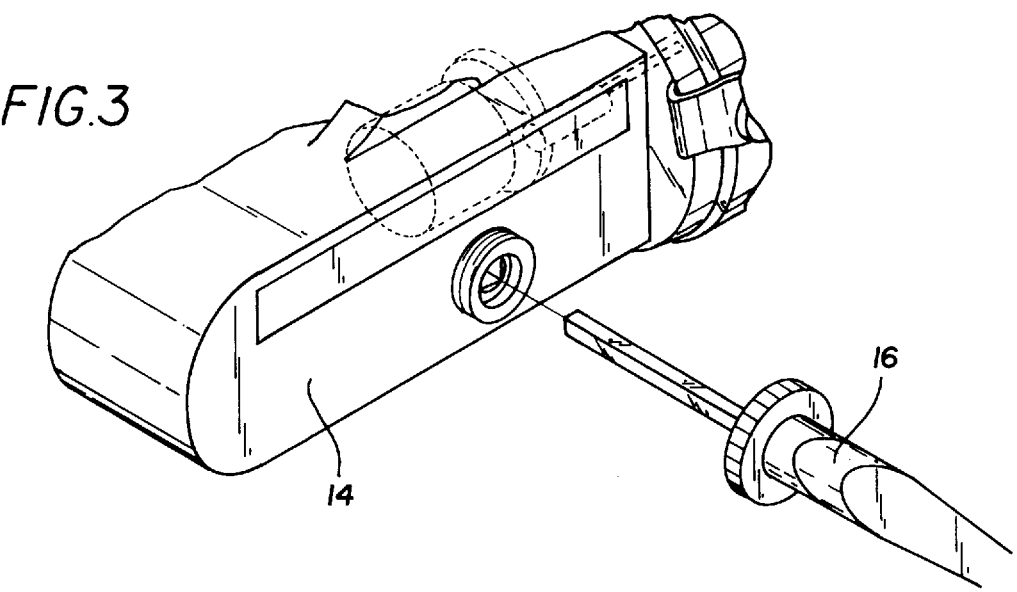
FIG. 3 is an exploded view of the present invention.

With reference now to the drawings, and in particular to FIGS. 1 through 6 thereof, a new motorized reeling assembly with automatic cut-off embodying the principles and concepts of the present invention and generally designated by the reference numeral 10 will be described.

The present invention, as designated as numeral 10, includes a fishing pole 12 with a reel 14 attached thereto at an inboard end thereof. The reel has a handle 16 rotatably coupled thereto. Associated therewith is a spool 18 rotatably coupled to the reel about an axis perpendicular to an axis about which the handle rotates. FIGS. 5 & 6 show a handle gear 20 having a predetermined width fixedly coupled with respect to the handle.

Next provided is a spool gear assembly 22 including a first gear 24 with a width twice that of the handle gear. During use, the first gear has a first side face 26 being in coplanar relationship with a first side face 28 of the handle gear. The spool gear assembly further includes a second gear 30 rotatably coupled about an axis perpendicular with respect to that of the first gear and further in engagement therewith. It should be noted that the second gear is fixed with respect to the spool for rotating coincident with the first gear. To accomplish such, the second gear preferably comprises a disk with a plurality of peripheral teeth formed thereon.

Also included is a motor assembly 31 with a motor 32 having a rotor extending between the handle gear and first gear of the spool gear assembly in parallel relationship with the handle. For reasons that will become apparent hereinafter, the rotor has a threaded portion 34 extending between a midpoint of the first gear of the spool gear assembly and a point adjacent the motor. During operation, the rotor of the motor is adapted to rotate at a speed dependent on an amount of voltage supplied thereto.

A drive assembly 36 is provided including a motor gear 37 having a bore formed therein to define an inner periphery which has a plurality of threads formed therein. As shown in FIGS. 5 & 6, the motor gear has a width equal to that of the handle gear. The motor gear is threadedly engaged with the threaded portion of the rotor of the motor assembly during use. As such, upon the supply of voltage to the motor, the motor is urged to the end of the threaded portion of the rotor such that a first side face 38 of the motor gear is coplanar relationship with a second side face 40 of the first gear of the spool gear assembly and in engagement therewith for allowing the automatic reeling of the reel. While not shown, a single elongated tooth is mounted on the interior of the reel in parallel with the rotor for engaging the motor gear when the same is not in engagement of the first gear of the spool assembly. This precludes free rotation of motor such that translation along the rotor is required.

The drive assembly further includes a manual gear 42 having a width equal to that of the handle gear. The manual gear is slidably situated on the rotor with a spacer 74 rotatably mounted on the rotor between the motor gear and the manual gear. To ensure that the motor and manual gears never both engage the first gear of the spool gear assembly at the same time, such spacer is equipped with a width equal to that of the first gear of the spool gear assembly. A spring 46 is coupled between an end of the rotor of the motor assembly and slidably abuts a first side face 48 of the manual gear for urging the manual gear into an orientation in which the first side face thereof is in coplanar relationship with that of the first gear of the spool gear assembly. It should be noted that the spring only urges the manual gear to such orientation upon the,lack of receipt of voltage by the motor thereby allowing the manual reeling of the reel.

Figure 4:
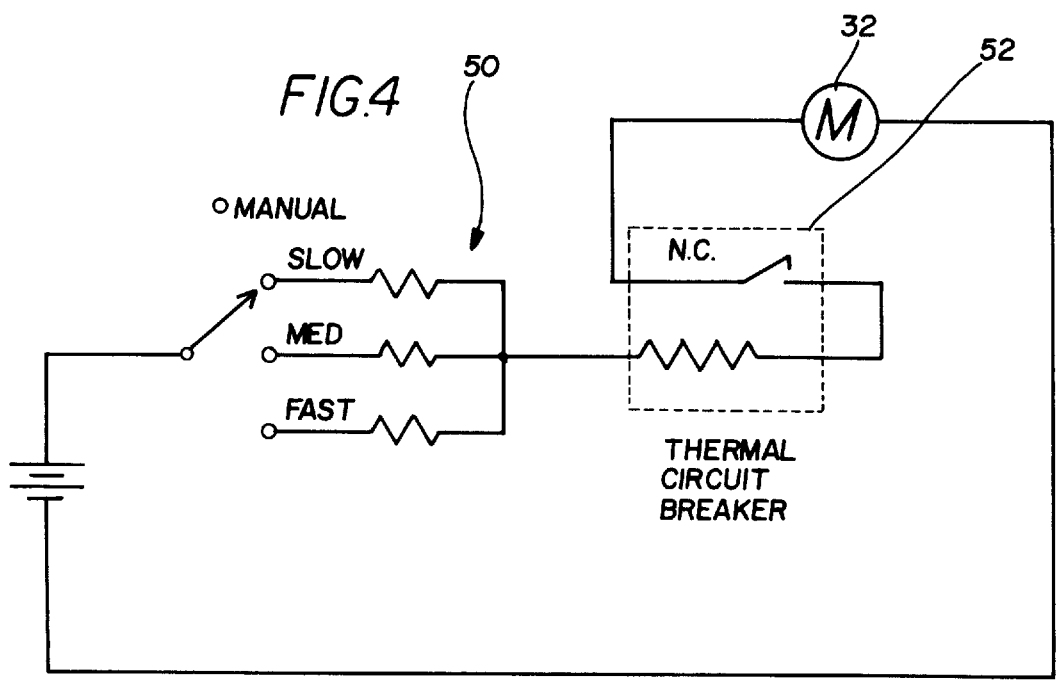
FIG. 4 is a schematic diagram of the present invention.

FIGS. 1 & 4 show a speed switch 50 mounted on the pole and connected between a power source and the motor. The speed switch is equipped with a deactuated orientation for precluding the supply of voltage to the motor and a plurality of actuated orientations each adapted to supply a unique voltage to the motor. In the preferred embodiment, the switch is a spring biased slide switch with the deactuated orientation being unbiased.

Finally, a load cut off switch 52 is coupled between the speed switch and the motor for precluding the supply of voltage to the motor upon a load being detected on a line of the pole. Such load is indicative of a fish being on the line. The load cut off switch thus functions to require the user to manually reel the line when a fish is caught. This is preferably accomplished by way of a thermal circuit breaker which opens upon a current associated with the motor exceeding a predetermined amount. It should be understood that the current is dependent on a load associated with the motor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic cut-off motorized reeling assembly comprising, in combination:

a fishing pole with a reel attached thereto at an inboard end thereof, the reel having a handle rotatably coupled thereto and a spool rotatably coupled thereto about an axis perpendicular to an axis about which the handle rotates;

a handle gear having a predetermined width and fixedly coupled with respect to the handle;

a spool gear assembly including a first gear with a width twice that of the handle gear with a first side face of the first gear of the spool gear assembly being in coplanar relationship with a first side face of the handle gear, the spool gear assembly further including a second gear rotatably coupled about an axis perpendicular with respect to the first gear and further in engagement therewith, the second gear fixed with respect to the spool for rotating coincident with the first gear;

a motor assembly including a motor having a rotor extending between the handle gear and first gear of the spool gear assembly in parallel relationship with the handle, the rotor having a threaded portion extending between a midpoint of the first gear of the spool gear assembly and a point adjacent the motor, wherein the rotor of the motor is adapted to rotate at a speed dependent on an amount of voltage supplied thereto;

a drive assembly including a motor gear having a bore formed therein to define an inner periphery which has a plurality of threads formed therein with the motor gear having a width equal to that of the handle gear, the motor gear being threadedly engaged with the threaded portion of the rotor of the motor assembly such that upon the supply of voltage to the motor, the motor is urged to the end of the threaded portion of the rotor such that a first side face of the motor gear is coplanar relationship with a second side face of the first gear of the spool gear assembly for allowing the automatic reeling of the reel, the drive assembly further including a manual gear having a width equal to that of the handle gear and slidably situated on the rotor with a spacer rotatably mounted on the rotor between the motor gear and the manual gear with a width equal to that of the first gear of the spool gear assembly and a spring coupled between an end of the rotor of the motor assembly and a first side face of the manual gear for urging the manual gear to an orientation in which the first side face thereof is in coplanar relationship with that of the first gear of the spool gear assembly only upon the lack of receipt of voltage by the motor thereby allowing the manual reeling of the reel;

a speed switch mounted on the pole and connected between a power source and the motor with a deactuated orientation for precluding the supply of voltage to the motor and a plurality of actuated orientations each adapted to supply a unique voltage to the motor; and a load cut off switch coupled between the speed switch and the motor for precluding the supply of voltage to the motor upon a load being detected on a line of the pole, as when a fish is caught, thereby requiring the user to manually reel the line.

2. An automatic cut-off motorized reeling assembly comprising:

a fishing pole with a reel attached thereto at an inboard end thereof, the reel having a handle rotatably coupled thereto and a spool rotatably coupled thereto about an axis perpendicular to an axis about which the handle rotates;

gear means connected between the spool and the handle for automatically reeling the reel only upon the receipt of voltage thus requiring the manual reeling of the reel upon the lack of receipt of voltage;

a switch connected between a power source and the gear means with a deactuated orientation for precluding the supply of voltage to the motor and an actuated orientation adapted to supply voltage to the motor; and cut off means for unconditionally precluding the supply of voltage to the gear means upon a load being detected on a line of the pole, as when a fish is caught, thereby requiring the user to manually reel the line.

3. An automatic cut-off motorized reeling assembly as set forth in claim 2 wherein the cut off means is a thermal circuit breaker.

4. An automatic cut-off motorized reeling assembly as set forth in claim 2 wherein the gear means precludes manual rotation upon the receipt of voltage.

5. An automatic cut-off motorized reeling assembly as set forth in claim 2 wherein the switch has a plurality of actuated orientations each for delivering a unique voltage.

* * * * *